United States Patent
Morales et al.

(10) Patent No.: US 11,014,018 B1
(45) Date of Patent: May 25, 2021

(54) APPARATUS COUPLED TO AN AIR-CIRCULATING DEVICE TO REDUCE TEMPERATURE OF A ROOM OR SURROUNDING

(71) Applicants: Steven Morales, Huffman, TX (US); Bill Nottingham, Huffman, TX (US)

(72) Inventors: Steven Morales, Huffman, TX (US); Bill Nottingham, Huffman, TX (US)

( * ) Notice: Subject to any disclaimer, the term of this patent is extended or adjusted under 35 U.S.C. 154(b) by 63 days.

(21) Appl. No.: 16/431,855

(22) Filed: Jun. 5, 2019

(51) Int. Cl.
*F24F 1/02* (2019.01)
*B01D 5/00* (2006.01)
*F04D 29/70* (2006.01)
*F04D 25/08* (2006.01)

(52) U.S. Cl.
CPC ........... *B01D 5/0087* (2013.01); *B01D 5/009* (2013.01); *B01D 5/0033* (2013.01); *F04D 25/08* (2013.01); *F04D 29/703* (2013.01); *F04D 29/706* (2013.01)

(58) Field of Classification Search
CPC ...... F25B 39/02; F25B 39/024; F25B 39/026; F24F 1/00; F24F 1/0022; F24F 1/02; F24F 1/0284; F24F 1/037; F24F 1/039; F24F 5/0035; B01D 5/0087; B01D 5/0033; B01D 5/009; F04D 29/706; F04D 29/703; F04D 25/08
USPC .............................. 34/59, 132, 469, 468, 467
See application file for complete search history.

(56) References Cited

U.S. PATENT DOCUMENTS

| | | | |
|---|---|---|---|
| 4,612,778 A * | 9/1986 | Medrano | F24F 6/04 62/311 |
| 5,245,236 A | 9/1993 | Horng | |
| 6,598,414 B1 * | 7/2003 | Cline | F24F 5/0035 62/314 |
| 7,419,368 B2 | 9/2008 | Milks | |
| 7,594,798 B1 | 9/2009 | Bucher et al. | |
| 2009/0031748 A1 * | 2/2009 | Sullivan | F28D 15/00 62/314 |
| 2014/0235153 A1 * | 8/2014 | Rankin | F24F 1/02 454/63 |

* cited by examiner

*Primary Examiner* — John P McCormack
(74) *Attorney, Agent, or Firm* — Sanchelima & Associates, P.A.; Christian Sanchelima; Alexander Rodriguez

(57) ABSTRACT

An apparatus coupled to an air-circulating device for reducing temperature of a surrounding is disclosed. The apparatus comprises a tray and upstanding sidewalls coupled to the tray. The upstanding sidewalls are covered with moss or any other suitable absorbent material. The apparatus comprises a pump provided at the bottom of the tray. Further, the apparatus comprises a hose in which one end of the hose is coupled to the pump. The apparatus comprises a canvas or any other suitable flexible material provided on the upstanding sidewalls and a lid provided at the top of the upstanding sidewalls and coupled to the canvas or any other suitable flexible material. The apparatus is placed behind the air-circulating device, wherein water stored in the tray is pumped using the pump through the hose and the water is made to fall onto the upstanding sidewalls. The air-circulating device draws air and moisture/water from the apparatus and directs the air current in a desired direction.

13 Claims, 4 Drawing Sheets

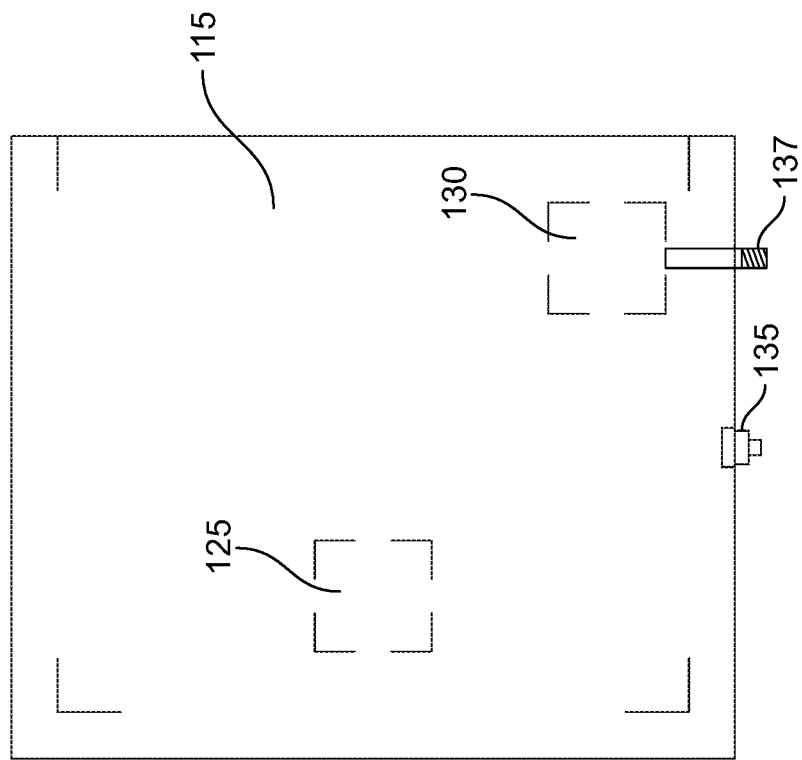

APPARATUS COUPLED TO AN AIR-CIRCULATING DEVICE TO REDUCE TEMPERATURE OF A ROOM OR SURROUNDING

BACKGROUND OF THE INVENTION

1. Field of the Invention

The present disclosure generally relates to air circulation devices. More specifically, the present disclosure relates to an apparatus coupled to an air-circulating device to reduce temperature of a room or surrounding.

2. Description of the Related Art

It is known that air circulation devices are commonly used to produce and direct air current to a desired location. The air current can be used to circulate stagnant air and produce a cooling effect. Generally, the air circulation devices comprise rotating fans with angled fins such that rotation of the fins pulls air from behind the device and propels air through the device, to produce an air current. The air current is directed such that a person situated in front of the device receives constant flow of cool, circulating air.

As known, the air circulation devices are provided at the ceiling or coupled to a wall using known mechanism. Alternatively, the air circulation devices may be placed on ground with the help of supporting structures such that the air circulation devices can be moved from one place to others.

Several examples of the air circulation devices have been disclosed in the past. One such example is disclosed in U.S. Pat. No. 7,594,798. In U.S. Pat. No. 7,594,798B1, it is disclosed that outdoor high velocity wall and pedestal mounted fans, devices, apparatus, systems and methods of operation. The fans can have water resistant motor housings with at most one rear wall located opening for allowing a power cord to pass therethrough. The switches and pull chains are connected to the fan only through the bottom of the motor housing. The bottom of the motor housing can have a drainage hole for allowing excess moisture to drain therefrom. The motor housing can be stainless steel. Additionally, the motor housing can have a powder coat finish on all parts to reduce corrosion. The motor can be an oversized inverted outdoor rated oscillating motor having improved gear mechanisms for big torques and reduces heat rise during fan operation. The fan can operate under hot and cold temperature extremes as well as during wet and dry environmental conditions.

Another example is disclosed in U.S. Pat. No. 5,245,236A. In U.S. Pat. No. 5,245,236A, it is disclosed that an industrial heat dissipating electric fan comprising a metal shaft tube to combine with a stator, the metal shaft tube having an annular groove for inner projecting ridges of a central shaft tube of a housing base to engage to combine firmly and securely related components.

Another example is disclosed in U.S. Pat. No. 7,419,368B2. In U.S. Pat. No. 7,419,368B2, it is disclosed that the present invention is directed towards an air circulation device. The air circulation device is capable of producing and directing an air current to a desired location. The air current is used to circulate stagnant air, which, in turn, provides a cooling effect. Advantageously, the device is electrically powered by 12-volt direct current (DC) but is capable of producing an air current of a magnitude similar to or greater than that produced by air circulation devices, which are powered by 120-volt alternating current (AC).

Although the above devices are capable of producing and directing air current to a desired location, they have few problems. For instance, the air circulation devices that are placed at large facilities such as in industries or offices are provided with very large fins. During warm seasons, the air circulation devices may supply warm air, which might cause inconvenience for the people present in the direction in which the air current is directed. Further, due to their large size, it is difficult to attach any other support device to provide air current at reduced temperature to provide pleasant environment for people situated in front of the device.

Other documents describing the closest subject matter provide for a number of more or less complicated features that fail to solve the problem in an efficient and economical way. None of these patents suggest the novel features of the present invention. Specifically, none of the disclosures in the art disclose an apparatus coupled to an air-circulating device such as an industrial fan to reduce temperature of a room or surrounding.

Therefore, there is a need in the art to provide an apparatus that can be coupled to an air-circulating device, which will help to reduce temperature of a room or surrounding.

SUMMARY OF THE INVENTION

It is one of the objectives of the present invention to provide an apparatus coupled to an air-circulating device for reducing temperature of a surrounding and that avoids the drawbacks of the prior art.

It is one object of the present invention to provide the apparatus is coupled to the air-circulating device such as a fan at the back.

It is one object of the present invention to provide an apparatus coupled to an air-circulating device for reducing temperature of a surrounding. The apparatus comprises a tray, upstanding sidewalls coupled to the tray. The upstanding sidewalls are covered with moss or any other absorbent or suitable material. The apparatus comprises a pump provided at the bottom of the tray. Further, the apparatus comprises a hose in which one end of the hose is coupled to the pump. The apparatus comprises a canvas or any other flexible or suitable material provided on the upstanding sidewalls and a lid provided at the top of the upstanding sidewalls and coupled to the canvas or any other flexible or suitable material. The apparatus is placed behind the air-circulating device, wherein water stored in the tray is pumped using the pump through the hose and the water is made to fall onto the upstanding sidewalls. The air-circulating device draws air and moisture/water from the apparatus and directs the air current in a desired direction.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 illustrates a bottom view of a bottom plate 110 of the apparatus 100, in accordance with one embodiment of the present disclosure.

DETAILED DESCRIPTION OF THE EMBODIMENTS OF THE INVENTION

The following detailed description is intended to provide example implementations to one of ordinary skill in the art and is not intended to limit the invention to the explicit disclosure, as one or ordinary skill in the art will understand that variations can be substituted that are within the scope of the invention as described.

The present disclosure discloses an apparatus coupled to an air-circulating device for reducing temperature of a surrounding. The apparatus comprises a tray, upstanding sidewalls coupled to the tray. The upstanding sidewalls may be covered with moss or any other absorbent or suitable material. The apparatus may comprise of a pump provided at the bottom of the tray. Further, the apparatus comprises a hose in which one end of the hose is coupled to the pump. The apparatus may include a canvas or any other flexible or suitable material provided on the upstanding sidewalls and a lid provided at the top of the upstanding sidewalls and coupled to the canvas or any other flexible or suitable material. The apparatus is placed behind the air-circulating device, wherein water stored in the tray is pumped using the pump through the hose and the water is made to fall onto the upstanding sidewalls. The air-circulating device draws air and moisture/water from the apparatus and directs the air current in a desired direction.

Various features and embodiments of an apparatus coupled to an air-circulating device for reducing temperature of a surrounding are explained in conjunction with the description of FIGS. 1-5.

Figure 1:
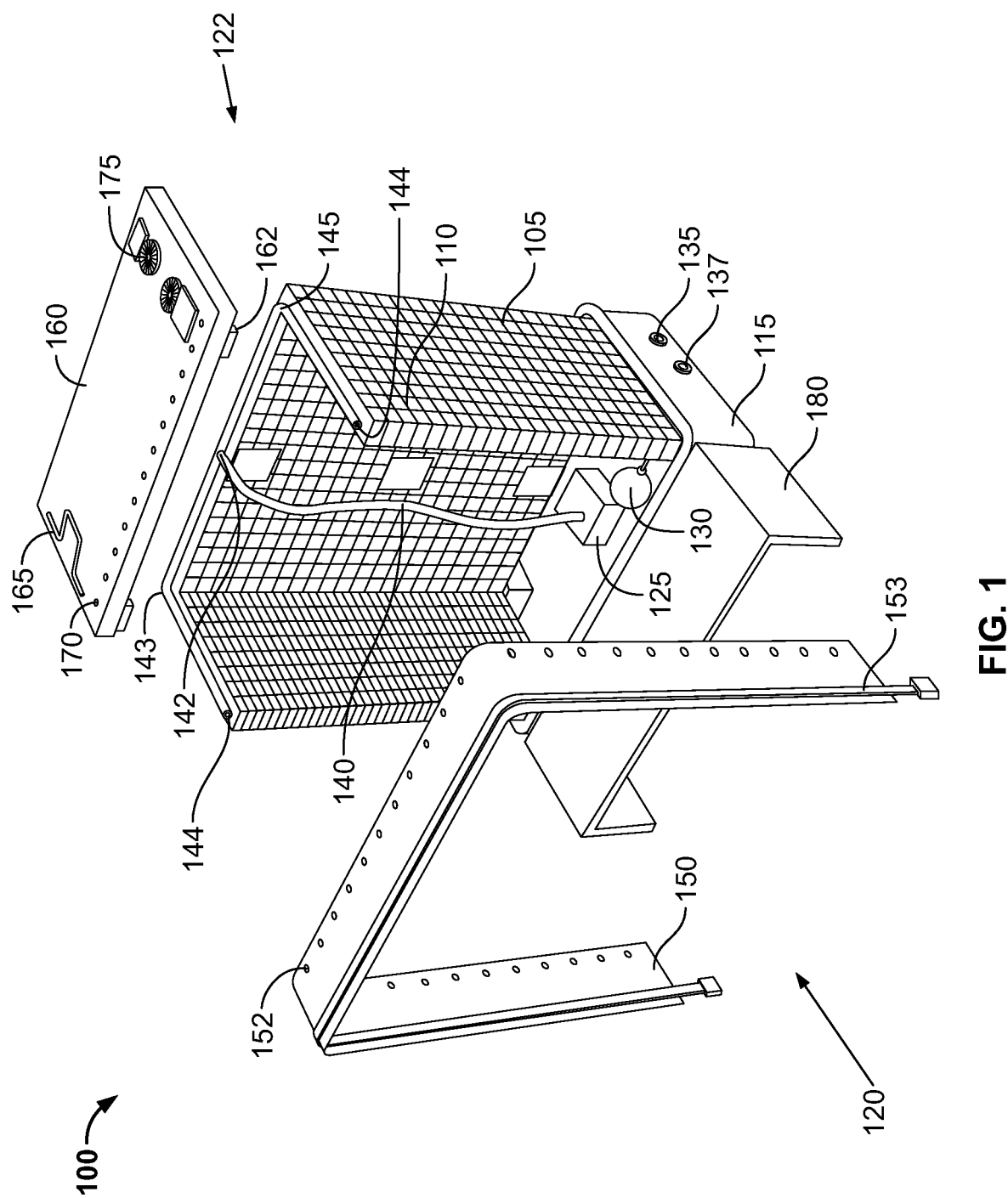
FIG. 1 illustrates a perspective view of an apparatus 100 used for reducing temperature of a room or surrounding, in accordance with one embodiment of the present disclosure.

Referring to FIGS. 1 to 4, an apparatus 100 that can be used with an air-circulating device to reduce temperature of a room or surrounding is explained. Referring to FIG. 1, a perspective view of the apparatus 100 is shown, in accordance with one embodiment of the present disclosure. The apparatus 100 comprises a housing 105. The housing 105 may be provided in a square, rectangular or any other shape. The housing 105 may comprise of upstanding sidewalls 110. It should be understood that the upstanding sidewalls 110 might be provided in three sides or four sides. In the current implementation, the upstanding sidewalls 110 are provided in three sides. Further, the upstanding sidewalls 110 might be provided as a solid or meshed structure made up of metal, plastic or any other suitable material. However, it is preferable to provide the upstanding sidewalls 110 in meshed structure.

Further, the apparatus 100 may comprise a tray or pan 115 provided at bottom of the upstanding sidewalls 110. The tray 115 might indicate a container made up of metal, plastic or any other suitable material. The tray 115 acts as a bottom for the upstanding sidewalls 110. Further, the tray 115 might be used as support mechanism for ensuring that the upstanding sidewalls 110 stay in upright position as shown in FIG. 1.

Figure 3:
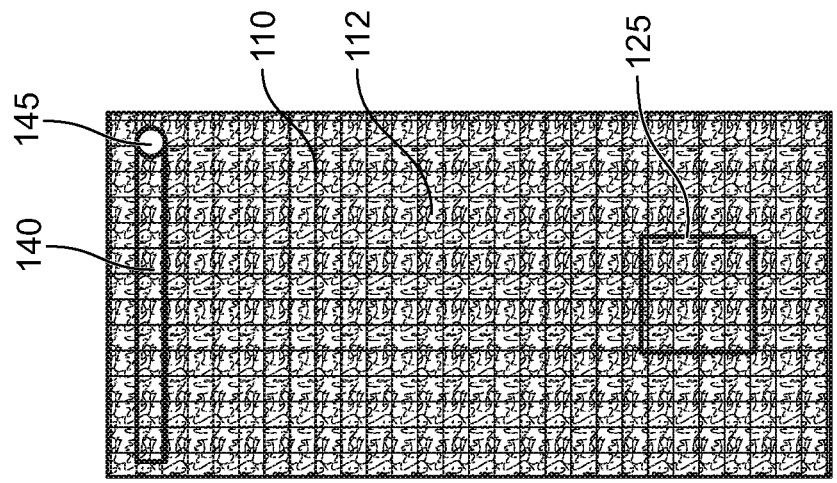
FIGS. 2 and 3 illustrate side views of upstanding sidewalls 115 of the apparatus 100, in accordance with another embodiment of the present disclosure.
Figure 2:
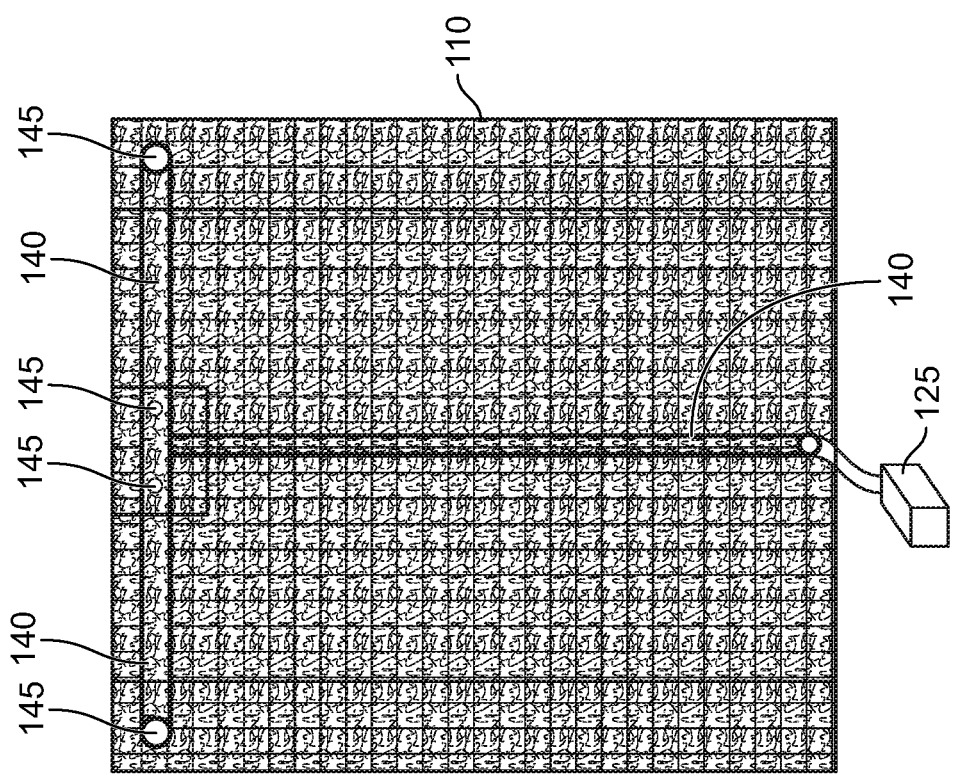

Further, the housing 105 may comprise a front end 120 and a rear end 122. At the bottom of the tray 115, the apparatus 100 may be provided with a pump 125, and a float 130. Further, the tray 115 may be provided with a drain 135 and a hose connection 137 at one end, as shown in FIGS. 1 and 4. Further, the apparatus 100 may comprise a hose 140 coupled to the pump 125 and extended until the top of the housing 105 or the upstanding sidewalls 110, as shown in FIGS. 1 2, and 3. The hose 140 may comprise connectors 145 at ends, such that a plurality of hoses of different length may be provided at the edges of the upstanding sidewalls 110 and also to adjust the length of the hoses 140 as may be required. Further, the upstanding sidewalls 110 may be provided with a plurality of hinges or clips 142 for coupling the upstanding sidewalls 110.

In one implementation, the upstanding sidewalls 110 might be filled or covered with moss or any other absorbent or suitable material. Referring to FIGS. 2 and 3, it can be seen that the upstanding sidewalls 110 are provided with moss.

The apparatus 100 may further comprise a canvas 150 or any other flexible or suitable provided in a U-shaped structure. The canvas 150 might be made up of plastic, metal or any other suitable material. The canvas 150 may be provided with a plurality of first snaps 152 across its length. Further, the canvas 150 may be provided with a strap 153 along its length as shown in FIG. 1. The strap 153 may help the apparatus 100 to remain firmly connected with the air-circulating device.

Figure 5:
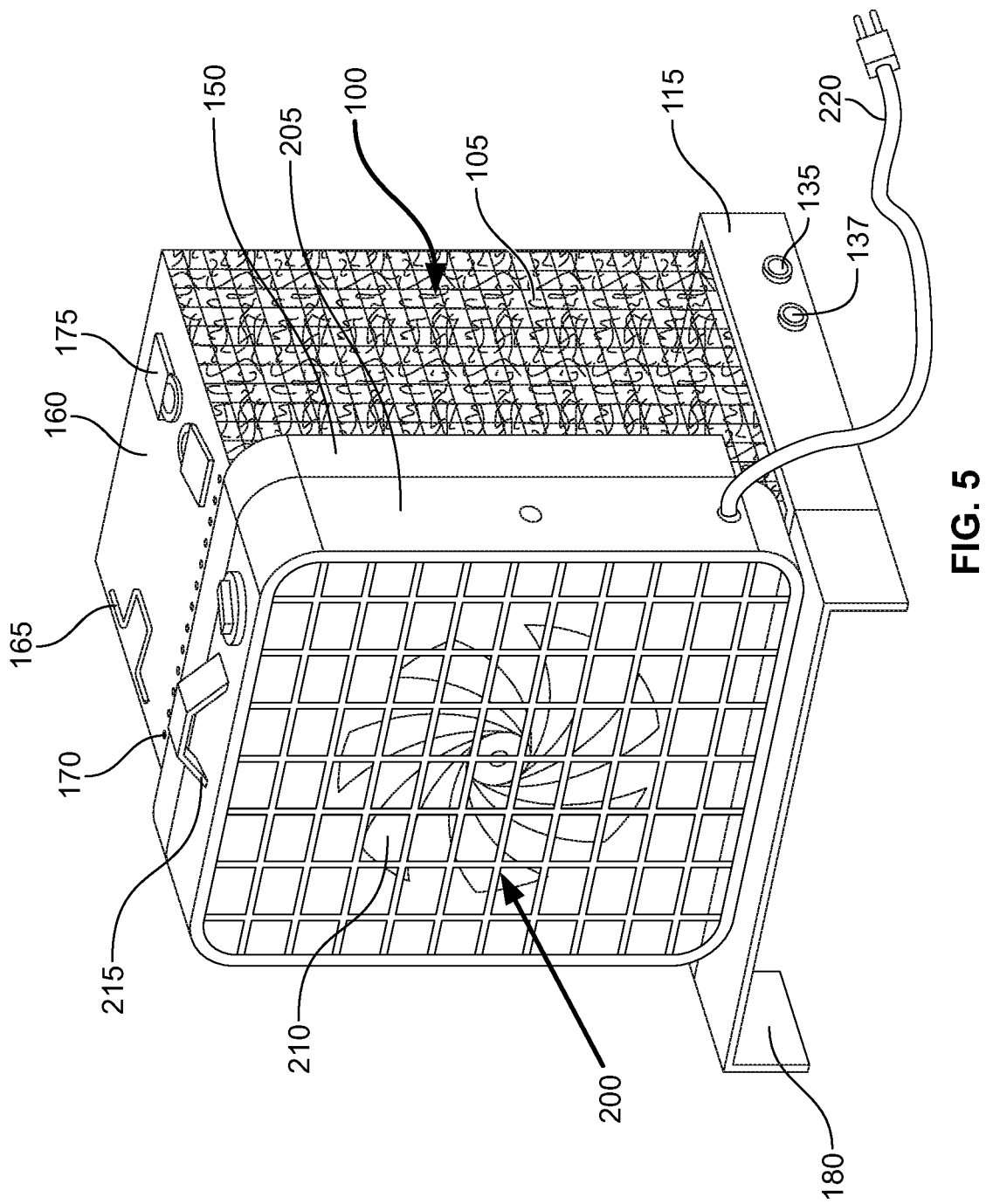
FIG. 5 illustrates a perspective view of apparatus 100 placed behind an air-circulating device 200 for reducing temperature of a surrounding, in accordance with one embodiment of the present disclosure.

In one embodiment, the apparatus 100 may comprise a lid 160 provided on top of the housing 105. As can be seen in FIGS. 1 and 5, the lid 160 may comprise clips 162 provided at the bottom of the lid 160. The clips 162 might be used to couple the lid 160 to the housing 105 at the upstanding sidewalls 110. Further, the lid 160 comprises a handle 165, used to lift or close the lid 160 in order to access the interior of the housing 105. The lid 160 may comprise a plurality of second snaps 170 provided across its length. It should be understood that plurality of second snaps 170 are aligned with the plurality of first snaps 152 provided at the canvas 150 in order to couple the lid 160 to the canvas 150.

Further, the lid 160 is provided with wheels 175. The wheels 175 are foldable or retractable in that when the lid 160 is placed on the housing 105, the wheels 175 are folded. Further, when the apparatus 100 is not in use, then the wheels 175 may be extended such that the lid 160 can be held with the help of the handle 165 to transport the lid 160 along with the housing 105 and the canvas 150 and the wheels 175 to move the apparatus 100 from one place to another.

In one exemplary implementation, the apparatus 100 may be provided with a stand 180 made up of plastic, metal or any other suitable material. The stand 180 may be removably coupled to the tray 115. Alternatively, the stand 180 may be placed adjacent to the tray 115 such that the air-circulating device can be placed on the stand 180.

In operation, the water is stored in the tray 115. It should be understood that the tray 115 containing water acts a lower sump. The water may be pumped using the pump 125 provided at the tray 115. The pump 125 may be operated using a cable (not shown) connected to a power source (not shown). The water may be pumped to the top of the housing 105 i.e., upstanding sidewalls 110 through the hose 140.

Subsequently, the water is made to flow through the hoses 140 provided at the sides or corners of the upstanding sidewalls 110.

The float 130 is used to determine level of the water in the tray 115. In one embodiment, the float 130 is coupled to a float switch (not shown). The float switch may be configured to deactivate the pump 125 from pumping the water when water level in the tray 115 goes below a predetermined threshold level.

The perforated hose 140 provided at the top of the upstanding sidewalls 110 may be provided with a fibrous distribution pad, in which one end is provided with ports for distributing the water evenly onto the upstanding sidewalls 110 when the pump 125 pumps the water. Subsequently, the water may flow down due to the gravity along the upstanding sidewalls 110. It should be obvious to a person skilled in the art that the water may come in contact with the moss or any other absorbent or suitable material provided at the upstanding sidewalls 115.

At one end, i.e., opposite side of the tray 115 in which the drain 135 is provided, the upstanding sidewalls 110 may be provided with absorbent material, which absorbs water and allows air to filter through the water. In one example, one end of the upstanding sidewalls 110 may be filled with water or ice fills.

In order to use the apparatus 100 with an air-circulating device for reducing the temperature of a room or surrounding, the apparatus 100 may be placed behind the air-circulating device. Referring to FIG. 5, the apparatus 100 coupled to an air-circulating device 200 is shown, in accordance with one embodiment of the present disclosure. In the present embodiment, the air-circulating device 200 is placed on the stand 180.

It should be understood that the air-circulating device 200 might indicate a fan or industrial fan that is either wall-mounted or fan placed on a ground or supported on a structure. The air-circulating device 200 may comprise a fan housing 205 provided in a square, rectangular or any other shape. The air-circulating device 200 may comprise a fan or blades 210 within the fan housing 205, which are used to produce and direct air current to a desired location. In one example, the air-circulating device 200 may include a handle 215 provided at the top of the fan housing 205 to lift the air-circulating device 200 and place at a desired location. Further, the air-circulating device 200 may comprise a cable 220 connected to a power source to operate the air-circulating device 200.

It should be understood that when the air-circulating device 200 is placed adjacent to the apparatus 100, the canvas 150 or any other flexible or suitable material may be positioned such that the canvas 150 or any other flexible or suitable material ensures that no hot air is sucked through between the apparatus 100 and the air-circulating device 200 and all air is circulated through the water.

Upon coupling, the air-circulating device 200 may be powered ON. When power is turned ON, the water in the apparatus 100 is pumped up and distributed along the upstanding sidewalls 110 using the hose 140 provided at the top of the upstanding sidewalls 110. Further, water is made to fall along the upstanding sidewalls 110. As known, the air-circulating device 200 operates by drawing or sucking the air from behind and directs the air current to the desired location. As such, due to the presence of the apparatus 100 behind, the air-circulating device 200 draws air and moisture from the water inside the apparatus 100. As specified above, the canvas 150 or any other flexible or suitable material is positioned such that the canvas 150 or any other flexible or suitable material ensures that no hot air is sucked through between the apparatus 100 and the air-circulating device 200 and all air is circulated through the water. Further, due to the presence of the water/moisture, the temperature of air that the air-circulating device 200 draws will be approximately the same as the temperature of the water inside the apparatus 100. Alternatively, if one of the upstanding sidewalls 110 is filled with ice fills, then the air drawn by the air-circulating device 200 will have the temperature of the ice fill. As a consequence, the air current produced and directed by the air-circulating device 200 will be less or same as the room temperature. Further, due to the presence of moss or any other absorbent or suitable material at the upstanding sidewalls 110, the water is filtered before the air-circulating device 200 draws it and subsequently, moisture is mixed with air in order to produce cooling effect by the air-circulating device 200.

It should be understood that the apparatus might be used with air-circulating device to provide an evaporating cooling effect in areas with low ambient humidity levels. Further, the apparatus might be used with air-circulating device during summers to produce cooling effect for the people working in an industrial setup.

It should be understood that excess water or unused water in the apparatus 100 might be drained out from the drain 135 provided at the tray 115.

Although the present disclosure is explained considering that the apparatus 100 is used to reduce the temperature of a room with the help of an air-circulating device 200, the present disclosure may also be used to increase the temperature of the room. In order to increase the temperature of the room, the apparatus 100 may be provided with a heating element removably coupled to the apparatus 100 at the bottom of the tray 115. The heating element may be used to heat or boil the water such that the air-circulating device 200 draws hot air and directs the air current to the desired location.

It should be understood that the upstanding sidewalls 110, canvas 150 or any other flexible or suitable material, lid 160 and tray 115 might be decoupled such that they can be transported from one place to another easily. Upon decoupling, the upstanding sidewalls 110, canvas 150 or any other flexible or suitable material and tray 115 may be placed on the placed on the lid 160 and the wheels 175 may be extending such that a user may hold the handle to push/pull the lid 160 carrying the upstanding sidewalls 110, canvas 150 or any other flexible or suitable material and tray 115.

Based on the above, it is evident that the apparatus explained above can be used with the air-circulating device to reduce the temperature of the room or surroundings.

It is obvious to a person in the art to provide the apparatus in variety shapes and sizes to couple the apparatus to an existing air-circulating device, or the apparatus may be manufactured along with the air-circulating device and provided as a single unit.

It is to be understood that the apparatus may be removably coupled to the air-circulating device that are existing whenever the temperature of room is high, in order to reduce the temperature of the room.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus coupled to an air-circulating device for reducing temperature of a surrounding, the apparatus comprising:
   a housing defined by three upstanding sidewalls each having a rectangular shape, wherein each of said three upstanding sidewalls are a meshed structure, wherein each of said three upstanding sidewalls are joined together to form a U-shaped walled structure with an inner portion, wherein said U-shaped walled structure further includes a top edge, wherein said three upstanding sidewalls are each filled with moss;
   a tray located entirely below said housing, wherein said tray includes four perimeter sides, wherein said three upstanding sidewalls are lined along three of the four perimeter sides of the tray, said tray having an open perimeter side when said housing is mounted thereon;
   a perforated hose extending along a sidewall of the three upstanding sidewalls from a bottom of said tray top to the top edge of the U-shaped walled structure, said perforated hose further extending along the entirety of the top edge of the U-shaped walled structure such that the perforated hose takes on a U-shape corresponding with the U-shape of said top edge, wherein said perforated hose further includes connectors disposed along the corner edges of the three upstanding sidewalls, wherein said perforated hose is coupled said sidewall via clips;
   a pump coupled to said perforated hose provided at the bottom of the tray;
   a canvas provided on the upstanding sidewalls; and
   a lid provided at the top of the upstanding sidewalls and coupled to the canvas, wherein the apparatus is placed behind the air-circulating device, wherein water stored in the tray is pumped using the pump through the perforated hose and the water is made to fall onto the upstanding sidewalls, wherein the air-circulating device draws air and moisture/water from the apparatus and directs the air current in a desired direction.

2. The apparatus of claim 1, further comprises a drain for draining water from the housing.

3. The apparatus of claim 1, further comprises a float at the tray to determine level of water in the tray.

4. The apparatus of claim 1, wherein said moss is instead any absorbent material.

5. The apparatus of claim 1, wherein said canvas is instead any flexible material.

6. The apparatus of claim 1, wherein the canvas is a U-shaped structure.

7. The apparatus of claim 6, wherein said canvas includes a strap lined along a first peripheral edge of the canvas.

8. The apparatus of claim 7, wherein said canvas further includes a plurality of first snaps line along a second peripheral edge of said canvas.

9. The apparatus of claim 1, wherein said lid further includes a handle located along a top surface of said lid.

10. The apparatus of claim 8, wherein said top surface of said lid further includes a plurality of second snaps lined across a peripheral edge of said lid.

11. The apparatus of claim 10 wherein said plurality of second snaps engage with the plurality of first snaps of said canvas to create a secure connection.

12. The apparatus of claim 1 wherein said top surface of said lid further includes at least two wheels which are foldable adapted to aid in the transportation of said housing.

13. An apparatus for reducing temperature of a surrounding area, consisting of:
   a) a housing defined by three upstanding sidewalls each having a rectangular shape, wherein each of said three upstanding sidewalls are a meshed structure, wherein each of said three upstanding sidewalls are joined together to form a U-shaped walled structure with an inner portion, wherein said U-shaped walled structure further includes a top edge, wherein said three upstanding sidewalls are each filled with an absorbent material;
   b) a tray located entirely below said housing, wherein said tray includes four perimeter sides, wherein said three upstanding sidewalls are lined along three of the four perimeter sides of the tray, said tray having an open perimeter side when said housing is mounted thereon;
   c) wherein said housing further includes a front end and a rear end, wherein said tray further includes a pump and a float located on a bottom of the tray, wherein said pump and said float are located entirely within said inner portion of the U-shaped walled structure, wherein said tray further includes a drain and a hose connection along a sidewall of the tray;
   d) a perforated hose coupled to said pump, said pump extending along a sidewall of the three upstanding sidewalls from a bottom of said tray top to the top edge of the U-shaped walled structure, said perforated hose further extending along the entirety of the top edge of the U-shaped walled structure such that the perforated hose takes on a U-shape corresponding with the U-shape of said top edge, wherein said perforated hose further includes connectors disposed along the corner edges of the three upstanding sidewalls, wherein said perforated hose is coupled said sidewall via clips;
   e) a canvas having a U-shaped structure, wherein said canvas includes a strap lined along a first peripheral edge of the canvas, wherein said canvas further includes a plurality of first snaps line along a second peripheral edge of said canvas;
   f) a lid provided on a top end of said housing, wherein said lid includes clips along a bottom end to couple said lid to the housing at the top edge of said three upstanding sidewalls, wherein said lid further includes a handle located along a top surface of said lid, wherein said top surface of said lid further includes a plurality of second snaps lined across a peripheral edge of said lid, wherein said plurality of second snaps engage with the plurality of first snaps of said canvas to create a secure connection, wherein said top surface of said lid further includes at least two wheels which are foldable adapted to aid in the transportation of said housing;
   g) a stand placed adjacently to said tray; and
   h) an air circulating device placed on said stand, wherein said pump supplies said perforated hose with water, wherein said perforated hose dispenses said water along said top edge of said three upstanding sidewalls, said water seeping into said absorbent material of said three upstanding sidewalls, wherein said air circulating device draws in air from within said housing to cool a surrounding area.

* * * * *